Sept. 28, 1965  H. C. HEUSER  3,208,312
RECESSING TOOL HOLDER
Filed Aug. 13, 1962  2 Sheets-Sheet 1
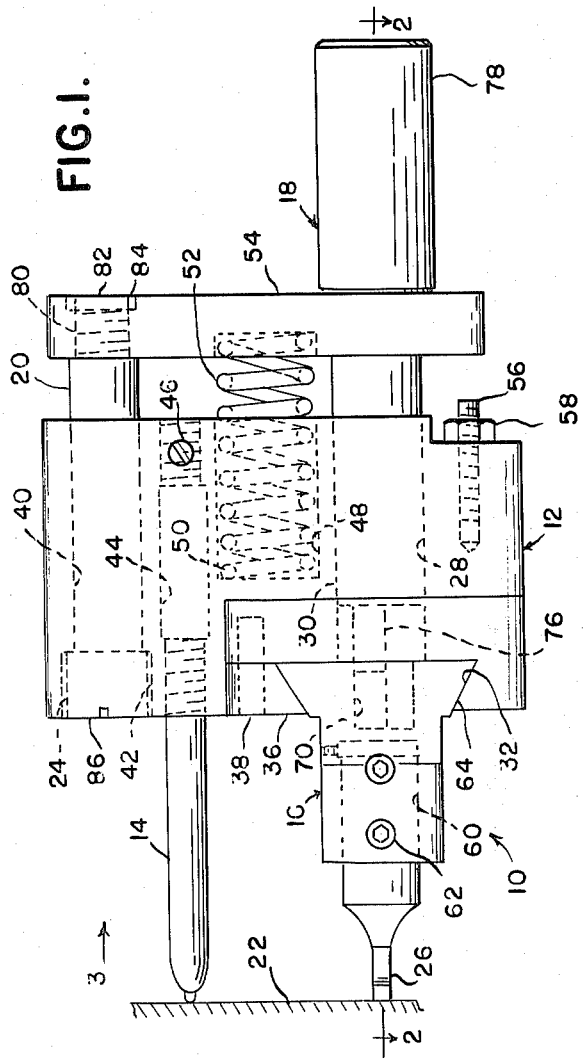
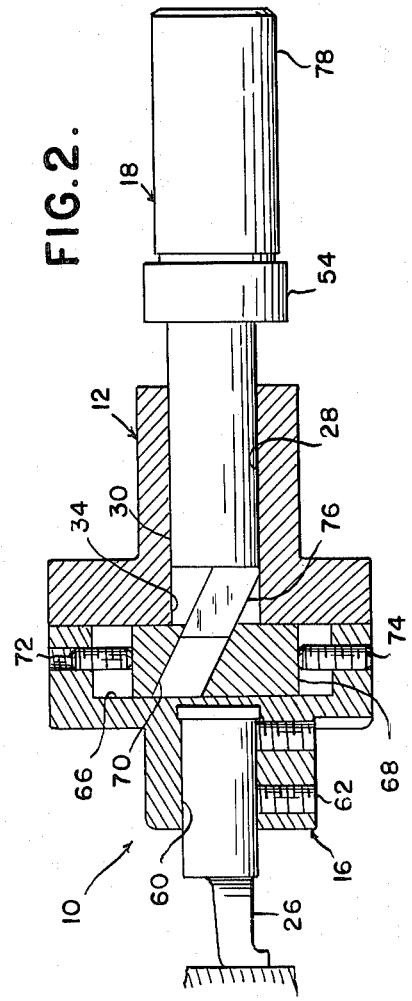
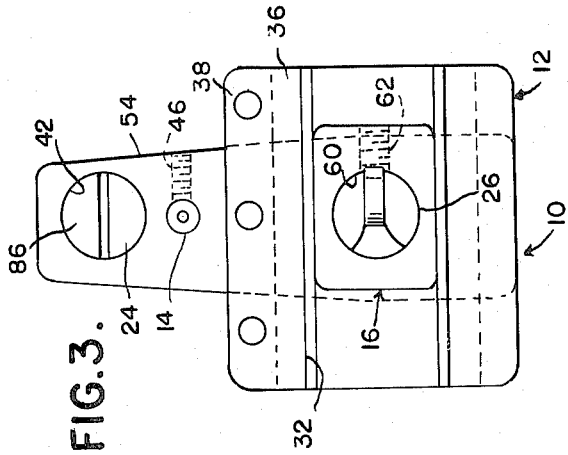
INVENTOR.
HELMUT C. HEUSER
BY
ATTORNEYS Sept. 28, 1965   H. C. HEUSER   3,208,312
RECESSING TOOL HOLDER
Filed Aug. 13, 1962   2 Sheets-Sheet 2

INVENTOR.
HELMUT C. HEUSER
BY
ATTORNEYS

United States Patent Office 3,208,312
Patented Sept. 28, 1965

3,208,312
RECESSING TOOL HOLDER
Helmut C. Heuser, Birmingham, Mich., assignor to Bokum Tool Company, Inc., Detroit, Mich., a corporation of Michigan
Filed Aug. 13, 1962, Ser. No. 216,605
2 Claims. (Cl. 77—58)

The invention relates to tool holders and refers more particularly to an improved tool holder including means for adjusting a tool carried thereby in a direction transverse to the longitudinal axis of the tool holder for cutting annular recesses and the like.

In the past tool holders including means for moving a tool carried thereby transversely of the longitudinal axis thereof for cutting annular recesses and the like have been known. With prior constructions however the means for moving the tool transversely of the tool holder has generally been relatively complicated and so constructed that non-concentric forces were applied to the tool holder during transverse movement of the tool whereby rapid wear of the tool holders has taken place. In addition the prior tool holder structures have not been practical for many manufacturing operations requiring the movement of a tool transversely of the tool holder due to area limitations in the vicinity of the article to be manufactured and dimensional tolerances of the article being manufactured.

It is therefore one of the objects of the present invention to provide a tool holder for cutting annular recesses and the like including improved means for moving a tool carried thereby transversely of the tool holder.

Another object is to provide a tool holder as set forth above wherein the forces applied thereto on movement of the tool transversely of the tool holder are concentric about the longitudinal axis of the tool holder.

Another object is to provide an improved tool holder including a body member having a bore extending therethrough and a dovetail slot extending transversely of said bore at one end thereof, a tool carrying slide positioned in said dovetail slot for movement transversely of the axis of the bore, a pilot bar inserted within the other end of the bore, means operable between the pilot bar and slide for moving the slide transversely of the bore on relative axial movement between the body member and pilot bar and means for stopping the movement of the body member toward a workpiece at a predetermined distance from a workpiece.

Another object is to provide a structure as set forth above wherein the body member includes a second bore extending therethrough substantially parallel to the first bore and a guide bar is secured to the pilot bar and inserted within the second bore for sliding movement therein and said means for stopping the axial movement of the body member is an axially adjustable shaft secured to the body member between the pilot bar and guide bar extending substantially parallel thereto.

Another object is to provide a tool holder as set forth above wherein a guide bar supporting member is provided on the pilot bar to provide an abutment to limit relative axial movement between the pilot bar and body member in one direction and the guide bar is provided with a radially extending flange at the outer end thereof for limiting the relative axial movement of the pilot bar with respect to the body member in the opposite direction.

Another object is to provide a tool holder including a body member having a bore extending axially therethrough and a dovetail slot extending transversely across one end of the bore, a tool carrying slide mounted in said dovetail slot for movement transversely of said bore, a pilot bar inserted within said bore, means operable between the pilot bar and slide for moving the slide transversely of the bore on relative movement between the body member and pilot bar axially of the bore and means concentric with said body member for limiting the axial movement of the body member in one direction.

Another object is to provide a tool holder as set forth above wherein a slot is provided in the pilot bar and a pin extends through the body member and into the slot whereby the relative axial movement of the pilot bar with respect to the body member is limited by movement of the pin between the ends of the slot and the ends of the slot are recessed to prevent build-up of material at the ends of the slot and consequent jamming of the pilot bar with respect to the body member on extended use of the tool holder.

Another object is to provide a tool holder as set forth above wherein the means for limiting axial movement of the body member comprises an annular bearing collar threaded onto the body member for adjustment axially thereof, an annular thrust bearing connected to and movable axially with the bearing collar and an abutment engaged with the thrust bearing and secured to a workpiece having a guide opening therethrough for receiving the body member.

Another object is to provide a tool holder which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is an elevation view of a tool holder constructed in accordance with the invention.

FIGURE 2 is a longitudinal section of the tool holder illustrated in FIGURE 1 taken substantially on the line 2—2 in FIGURE 1.

FIGURE 3 is an end view of the tool holder illustrated in FIGURE 1 taken in the direction of arrow 3 in FIGURE 1.

Figure 4:
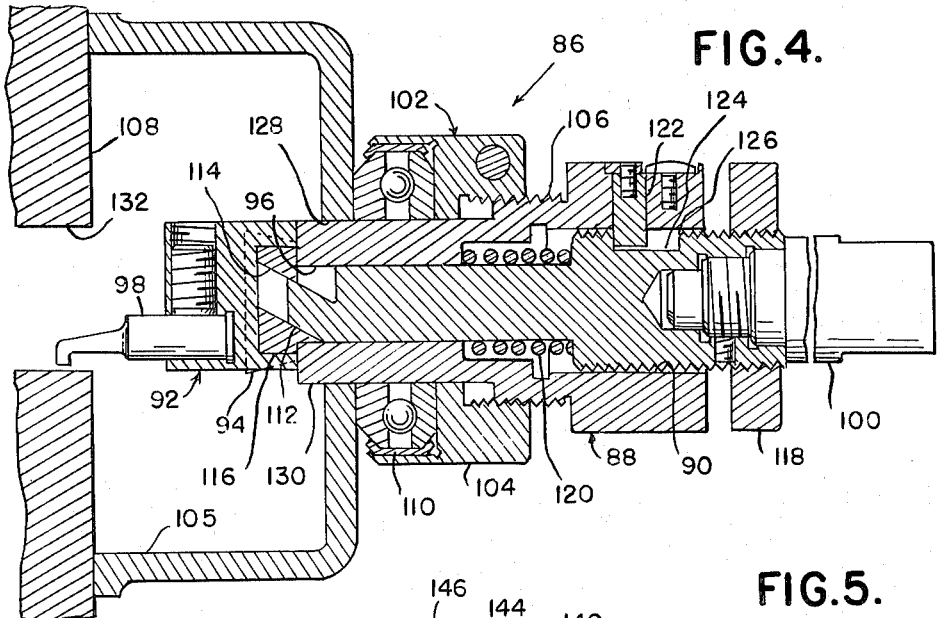
FIGURE 4 is a longitudinal section view of a modification of the tool holder illustrated in FIGURE 1.

With reference to the figures of the drawings, one embodiment of the present invention will now be considered in detail.

The tool holder 10, as shown in FIGURES 1-3, includes a body member 12 having a shaft 14 secured thereto, a tool carrying slide 16 and pilot bar 18 carrying guide bar 20. In accordance with the invention the shaft 14 is secured to the body member 12 between the pilot bar 18 and guide bar 20. Further, in accordance with the invention, the guide bar 20 is provided with an enlarged head 24 to limit travel of the pilot bar 18 in one direction with respect to the body member 12 while the guide bar supporting member 54 limits relative motion between the pilot bar and body member in the opposite direction.

In operation the tool holder 10 is advanced toward a workpiece 22 until the shaft 14 engages the workpiece at which time the movement of the body member toward the workpiece is stopped and the pilot bar 18 is moved relative thereto to produce transverse movement of the slide 16 carrying the tool 26.

Due to replacement of the shaft 14 between the pilot bar 18 and guide bar 20 less wear of the pilot bar 18 in use is produced than has been the case with previous tool holder constructions. Further the useful life of the tool holder 10 is increased due to the positive limiting of the relative movement between the pilot bar and body member by the guide bar 20 and guide bar supporting member 54 rather than with a pin and slot as has been the case with previous tool holders.

More specifically the body member 12, shaped as shown in FIGURES 1–3, includes a first bore 28 extending therethrough axially of the tool holder for receiving the end 30 of the pilot bar 18. A dovetail slot 32 is provided in the body member 12 extending transversely across end 34 of the bore 28 one side of which is formed by the member 36 removably secured to the body member 12 by convenient means, such as bolts 38.

A second bore 40 is provided in the body member 12 extending substantially parallel to the bore 28 and positioned in spaced relation thereto. Bore 40 has an enlarged diameter portion 42 and receives the guide bar 20 for reciprocation therein. The body member 12 also includes the threaded passage 44 extending therethrough for receiving the shaft 14 which is held in adjustable position therein by convenient means, such as the set screw 46.

Recess 48 is provided in the body member 12 to receive the end 50 of spring 52. Spring 52 operates between the transversely extending guide bar supporting member 54 which is carried by the pilot bar 18 and the body member 12 to urge the end 30 of the pilot bar 18 out of the bore 28 in the body member 12.

Adjusting screw 56 and locking nut 58 therefor are provided on the body member 12 to limit the axial movement of the pilot bar 18 into the bore 28 in conjunction with guide bar supporting member 54.

Slide 16 is shaped, as shown best in FIGURES 1–3, and includes a recess 60 therein into which the shank of a cutting tool 26 is positioned and held by means of the set screws 62. Slide 16 is further provided with the dovetail base 64 slidably received in the dovetail slot 32 in the body member. Base 32 is provided with the recess 66 therein.

A slide block 68 having the inclined keyway 70 is positioned in the recess 66 and is adjustable longitudinally thereof by movement of the positioning screws 72 and 74 in opposite directions. Positioning of the slide block 68 with the screws 72 and 74 varies the initial radial position of the slide 16 relative to the longitudinal axis of the pilot bar 18.

Pilot bar 18 includes the inclined key 76 on the end 30 thereof engaged in the inclined keyway 70 of the slide block 68, as shown best in FIGURE 2. The opposite end 78 of the pilot bar 18 is adapted to be secured in an axially movable spindle which may be rotated in certain installations.

As previously indicated the supporting member 54 for the guide bar 20 is secured to or is an integral part of the pilot bar 18. The guide bar 20 is rigidly secured to the supporting member 54 by means of the reduced threaded portion 80 on the end 82 of the guide bar 20 which may, if desired, be locked in place on the support member 54 by a lock nut 84. The end 86 of the guide bar 20 is provided with the radially enlarged portion 24 as previously indicated to limit the relative movement of the pilot bar 18 and body member 12 axially of the tool holder 10 under urging of the spring 52.

In overall operation of the tool holder illustrated in FIGURES 1–3, with the shaft 14 positioned to determine the depth from the face of a workpiece 22 at which it is desired to cut an internal groove in the workpiece 22 and with the adjusting screw 56 positioned to determine the depth to which the end 30 of the pilot bar 18 may be inserted within the bore 34 of the body member 12 whereby the radial movement of the tool 26 is determined in conjunction with the position of the enlarged portion 24 of the end 26 of guide bar 20, the tool holder 10 which is secured in a spindle or similar holding structure at end 78 of the pilot bar 18 is moved axially relative to the workpiece 22. When the shaft 14 engages the workpiece 22 the movement axially of the tool holder of the body member 12 is halted while the pilot bar 18 continues to move axially of the tool holder 10 relative to the body member 12 in opposition to the bias of spring 52. Due to the engagement of the inclined key 76 with the keyway 70 in the slide block 68 of slide 16 the slide 16 is caused to move transversely of the longitudinal axis of the tool holder 18 in the dovetail slot 32 to move tool 26 into a cutting relation to workpiece 22.

It will be noted that in the operation of the tool holder illustrated in FIGURES 1–3 as set forth above little eccentric force is exerted on the pilot bar 18 and guide bar 20 since the shaft 14 is located between the pilot bar 18 and guide bar 20 as compared to constructions wherein the guide bar 20 is located between the shaft 14 and pilot bar 18. Further due to the provision of the enlarged portion 24 of the guide bar 20 the outermost position of the pilot bar with respect to the bore 28 in the body member 12 is exactly determined over extended use of the tool holder 10. This is in contrast to prior structures wherein a pin and slot acting between the body member and pilot bar have been used to determine the limiting relative axial position thereof. With the prior pin and slot constructions extended use of the tool holder 10 has produced relative wear between the pin and slot so that inaccuracies of the limiting positions of the pilot bar and body member and binding between the pilot bar and the body member have occurred. The inner limiting of the pilot bar within the bore 28 is of course determined by the adjustment of the adjusting screw 56 in conjunction with the guide bar supporting member 54 as previously indicated.

A modified tool holder 86, constructed in accordance with the invention is shown in FIGURE 4. The tool holder 86 illustrated in FIGURE 4 includes the body member 88 having the variable diameter bore 90 extending therethrough, slide 92 slidably received in the dovetail slot 94 extending across end 96 of bore 90 of the body member 88 carrying cutting tool 98, pilot bar 100 extending through bore 90 in the body member 88 and abutment means 102 operable in conjunction with the positioning fixture 105 for limiting the axial movement of the body member 88.

Abutment means 102 includes the annular bearing collar 104 shaped as shown best in FIGURE 4 which is threadedly engaged with the body member 88 by threads 106 for relative axial adjustment on the body member 88 whereby the depth of the annular recess produced in workpiece 108 from the face of the workpiece is determined. The thrust bearing 110 is secured to collar 104 by convenient means, as shown, to permit relative rotation between the workpiece 108 and tool holder 86 in operation.

As before relative axial movement of the pilot bar 100 of the tool holder 86 with respect to the body member 88 will produce transverse movement of the slide 92 with respect to the tool holder 86 due to the engagement of the inclined key 112 on the pilot bar 100 in the inclined keyway 114 in the slide block 116 carried by the slide 92.

The maximum insertion of the pilot bar 100 into the bore 90 of the body member 88 is determined by the position of the locating washer 118 threaded on the pilot bar 100. Spring 120 is provided acting between the pilot bar 100 and body member 88 to maintain the pilot bar 100 in an outermost position with relation to the bore 90 of the body member 88.

The outermost position of the pilot bar 100 with respect to the bore 90 of the body member 88 is determined by the pin 122 carried by the body member 88, as shown best in FIGURE 4, extending within the slot 124 provided in the pilot bar 100 of the tool holder 86. Binding of the pilot bar 100 with the body member 88 due to deformation of the pilot bar at the ends of the slot 24 is prevented by providing a recess 126 at the outer edge of each end of the slot 124 in the pilot bar 100, as shown in FIGURE 4.

In operation of the modified tool holder 86 the positioning fixture 105 having the opening 128 for receiving the end 130 of the body member 88 is positioned on the workpiece 108 so that the opening 128 is exactly aligned with the opening 130 in the workpiece 108. The tool holder 86 is then advanced toward the workpiece 108 with the slide 92 and body member 88 passing through the opening 128 and being guided thereby. With the cutting tool 98 positioned to cut a desired annular recess in the workpiece 108 the thrust bearing 110 of abutment means 102 engages the positioning fixture 105 to halt the axial movement of the body member 88. Continued axial movement of the pilot bar 100 within the body member 88 is limited by the position of the abutment 118 and produces desired transverse feeding of the slide 92 and cutting tool 98.

With the modified structure of FIGURE 4 it will be seen that the elements thereof are substantially centrifugally balanced so that eccentric forces tending to cause rapid wear of the tool holder 10 are not present in the tool holder 86. Further it will be seen that due to the individual positioning of the positioning fixture 105 that exact transverse positioning of the cutting tool with respect to a workpiece may be accomplished so that the annular recess produced thereby in the workpiece 108 will be the same depth around the entire circumference thereof which would not be the case if the tool holder were advanced toward the workpiece 108 slightly eccentric with respect to the opening 132 therein.

The groove produced by the cutting tool held by the tool holder 86 may however be positioned at a variable depth from the face of similar workpieces 108 due to manufacturing variances in the position of the surface of the workpiece 108 to which positioning fixture 105 is secured. Further such variance of the axial position of a groove produced in the workpiece 108 may be produced by the relatively slight but sometimes not negligible deflection of the portion of the positioning fixture 105 extending transversely of the longitudinal axis of the tool holder 86. To meet these objections to the tool holder 86 in combination with the positioning fixture 105 and to provide a tool holder for cutting annular recesses in workpieces wherein limited room is available adjacent the workpiece the modified tool holder 134 illustrated in FIGURE 5 has been provided.

Figure 5:
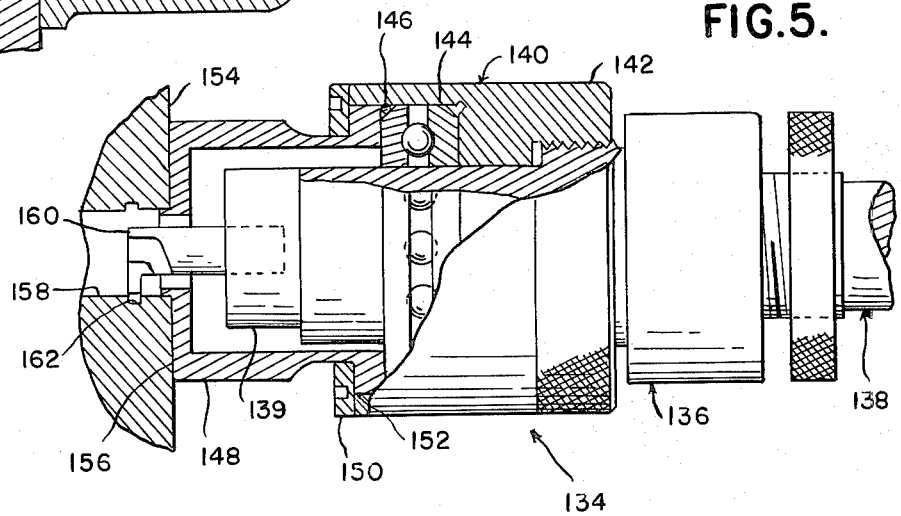
FIGURE 5 is an elevation view partly in section of another modification of the tool holder illustrated in FIGURE 1.

The modified tool holder illustrated in FIGURE 5 includes a body member 136, pilot bar 138 and slide 139 which are exactly the same as the corresponding elements in the tool holder 86. The body member, pilot bar and slide of the modified tool holders 86 and 134 are in fact interchangeable. The adjustable abutment means 140 of the tool holder 134 however includes the annular bearing collar 142 threadedly adjustably attached to the body member 136 as before having the thrust bearing 144 secured thereto by the snap-ring 146 and the positioning fixture 148 abutting the bearing 144 and held in position on the bearing collar 142 by means of the annular plate 150 and annular flange 152.

Operation of the modified tool holder 134 of FIGURE 5 is entirely analogous to that of tool holder 86. Thus the tool holder is advanced axially toward the workpiece 154 until the surface 156 of positioning fixture 148 engages the surface of the workpiece 154 around the opening 158 therein. The axial movement of the body member 136 is thus halted and transverse movement of the cutting tool 160 is initiated on further axial movement of the pilot bar 138 relative to the body member 136.

The tool holder 134 including the positioning fixture 148 has the advantage of positioning grooves 162 in workpieces 154 which are always the same distance below the adjacent surface of the workpieces 154. The tool holder 134 is further capable of use in locations where very little room adjacent the opening 158 is available. With the tool holder 134 alignment of the annular recess 162 within the opening 158 transversely thereof depends on the alignment of the axis of the tool holder 134 with the axis of the opening 158. Thus grooves 162 slightly eccentric with respect to openings 158 are more likely to occur with the tool holder 134 including the positioning fixture 148 than they are with the tool holder 86 in conjunction with the positioning fixture 105 which is initially positioned with the opening 128 exactly concentric with the opening 128 in workpiece 108.

While one embodiment of the present invention and two modifications thereof have been considered in detail, it will be understood that other embodiments and modifications are contemplated. It is therefore the intention to include all embodiments and modifications of the disclosed tool holder which are defined by the appended claims within the scope of the invention.

What I claim as my invention is:

1. A tool holder comprising a body member having a bore extending therethrough having external threads located centrally thereof, a dovetail slot extending across one end of said bore, a dovetail slide positioned in said dovetail slot including an inclined axially extending recess in the bottom thereof in communication with said bore extending through said body member, a pilot bar extending into the other end of said bore having an inclined key on the end thereof extending into said inclined recess for producing movement of said slide transversely of said bore on relative movement of said body member and pilot bar axially of said bore, an adjustable abutment means secured to said body member for accurately locating the tool with respect to an opening in a workpiece both radially and axially comprising an annular bearing collar threadedly engaged with the threads on the exterior of the body member for movement axially thereof, an annular thrust bearing sleeved over the body member and positioned within the recess in the bearing collar, a snap ring within the recess in the bearing collar exterior of the thrust bearing for securing the thrust bearing within the bearing collar, a positioning fixture comprising a hat-shaped member having a radially outwardly extending flange at the open end thereof engaged with the thrust bearing within the recess in the annular bearing collar outwardly of the recess with respect to the snap-ring and surrounding the slide, said hat-shaped member having an opening in the top thereof and an axially extending annular flange around said opening through which a tool carried by the slide extends, said axially extending flange serving to radially locate the tool with the top surface of the hat-shaped member serving to locate the tool axially with respect to the workpiece and means extending over the radially outwardly extending flange on the positioning fixture secured to the annular bearing collar outwardly of the radially outwardly extending flange of the positioning fixture with respect to the recess in the annular bearing collar for securing the positioning fixture within the recess.

2. A tool holder comprising an elongated body member having a bore extending therethrough having external threads located centrally thereof and a dovetail slot across one end of the bore, a dovetail cutting tool carrying slide having an inclined recess in the bottom thereof positioned within said dovetail slot with the recess in communication with one end of the bore, a pilot bar extending into the other end of the bore having an inclined key on one end thereof extending into the recess in the slide, said pilot bar extending through said bore in said body member and having threads on the other end thereof, a nut threadedly engaged with said other end of the pilot bar for axial movement along said pilot bar to limit the relative axial movement between said pilot bar and body member, an adjustable abutment secured to said body member including an annular bearing collar threadedly engaged with the body member and having a recess in the surface thereof adjacent the slide and an annular thrust bearing received within said recess and extending out of said recess, a hat-shaped member having an opening in the top thereof sleeved over said body member in contact with said annular bearing adapted to be secured to a workpiece over an opening therein whereby said positioning member radially positions the tool through radial engagement with the body member with the surface of the opening through the top of the positioning member and axially positions the tool through engagement of the top of the hat-shaped member with the thrust bearing.

References Cited by the Examiner

UNITED STATES PATENTS

| | | |
|---|---|---|
| 1,771,534 | 7/30 | Garrard. |
| 2,247,283 | 6/41 | Young. |
| 2,276,727 | 3/42 | Johnson. |
| 2,365,549 | 12/44 | Haynes. |
| 2,601,541 | 6/52 | Maxwell. |
| 2,818,753 | 1/58 | Leggett _____ 77—58 |
| 3,076,355 | 2/63 | Heuser _____ 82—1 X |

FOREIGN PATENTS 1,038,110   5/53   France.

WILLIAM W. DYER, JR., *Primary Examiner.*